US006955081B2

(12) United States Patent
Schwulst

(10) Patent No.: US 6,955,081 B2
(45) Date of Patent: Oct. 18, 2005

(54) ELECTRONIC ENGINE CONTROL WITH REDUCED SENSOR SET

(76) Inventor: Kyle Earl Edward Schwulst, 6833 Strawberry Lake Rd., Whitmore Lake, MI (US) 48189

( * ) Notice: Subject to any disclaimer, the term of this patent is extended or adjusted under 35 U.S.C. 154(b) by 0 days.

(21) Appl. No.: 10/953,640

(22) Filed: Sep. 29, 2004

(65) Prior Publication Data

US 2005/0039526 A1 Feb. 24, 2005

Related U.S. Application Data

(63) Continuation-in-part of application No. 10/642,530, filed on Aug. 14, 2003, now Pat. No. 6,804,997.

(51) Int. Cl.[7] .......... G01P 5/00
(52) U.S. Cl. .......... 73/118.2
(58) Field of Search .......... 73/118.1, 116, 73/118.2; 123/316, 406.62

(56) References Cited

U.S. PATENT DOCUMENTS

| | | | |
|---|---|---|---|
| 4,022,169 A | | 5/1977 | Tanaka |
| 4,159,702 A | | 7/1979 | Akman |
| 4,276,601 A | | 6/1981 | Tokuda |
| 4,291,382 A | | 9/1981 | Full |
| 4,930,482 A | | 6/1990 | Kako |
| 5,213,080 A | | 5/1993 | Lambert |
| 5,983,714 A | * | 11/1999 | Izumiura et al. .......... 73/118.1 |
| 6,035,826 A | * | 3/2000 | Matsuoka .......... 123/406.62 |
| 6,119,669 A | | 9/2000 | Yung |
| 6,286,492 B1 | | 9/2001 | Kanno |
| 6,405,706 B1 | * | 6/2002 | Hammoud et al. .......... 123/316 |
| 6,453,879 B2 | | 9/2002 | Kanno |
| 6,530,360 B1 | | 3/2003 | Kondo |
| 6,600,322 B1 | | 7/2003 | Nussbaum |
| 6,745,121 B2 | * | 6/2004 | Watanuki et al. .......... 73/116 |

* cited by examiner

*Primary Examiner*—Edward Lefkowitz
*Assistant Examiner*—Takisha Miller

(57) ABSTRACT

An engine control apparatus is disclosed for determining crankshaft position, engine phase, engine loading, and intake air mass of an internal combustion engine (10) through monitoring intake air pressure fluctuations (120). The opening of the intake valve (44) is mechanically linked to the crankshaft position of an engine. When the intake valve (44) opens it creates air pressure fluctuations in the air induction system (14) of the engine (10). The control apparatus is configured to determine intake air pressure fluctuations indicative of an intake air event (100 to 110) and thus a particular crankshaft position, and their corresponding period of the engine cycle. The controller then uses this information to determine crankshaft speed and position for the purpose of fuel injection and ignition timing of the internal combustion engine. Engine phase is also determined on four-stroke engines. Intake air pressure is used to determine intake air mass and loading of the engine. This combination results in a single sensor used in a system to determine intake air mass, engine loading, injected fuel mass, and to determine timing for fueling and ignition events. The engine may also include a crankshaft position sensor in combination with monitoring intake air pressure over time to increase resolution in the determination of crankshaft position.

18 Claims, 3 Drawing Sheets

ELECTRONIC ENGINE CONTROL WITH REDUCED SENSOR SET

CROSS REFERENCE TO RELATED APPLICATIONS

This application is a CIP of Ser. No. 10/642,530 filed Aug. 14, 2003, now U.S. Pat. No. 6,804,997 by the present inventor.

FEDERALLY SPONSORED RESEARCH

Not Applicable

SEQUENCE LISTING

Not Applicable

BACKGROUND OF THE INVENTION—FIELD OF INVENTION

The present invention is directed to an intake air pressure sensor assembly for an internal combustion engine, and in particular, a fuel-injected engine that communicates with a controller for determining intake air mass and controlling the fuel injectors and ignition timing of said engine.

BACKGROUND OF THE INVENTION

In all fields of engine design there is emphasis on fuel economy, engine performance, and most notably, engine-out emissions. Increased emissions restrictions have led to the necessity of a more accurate fuel metering process. Fuel injection systems have emerged as an accurate way to control the air and fuel mixture in an internal combustion engine and thus keep emissions low. The trend towards fuel injection has not been without added costs, and as such has limited the applications of this technology in price sensitive markets. To apply traditional automotive fuel injection systems to an engine, one must add an engine controller, a more complex fuel system, and multiple sensors. In addition, engines often need to be redesigned to allow for the application of these control electronics and sensors. All of these components add costs and complexity to the engine system. Many manufacturers simply cannot be competitive with the added costs of fuel injection in their product line, and as such are delaying its implementation until emissions regulations mandate its use. It would be ideal to have an accurate system for controlling an internal combustion engine that is less complex and less costly to implement on current engine technology.

A four-stroke engine must rotate two complete rotations for one full engine cycle. This cycle is comprised of the intake, compression, power, and exhaust strokes. The four-stroke cycle is based on a 720° cycle, or two complete rotations of the crankshaft. In relation to four-stroke engines, the engine phase determines which half of the 720° cycle the engine is on. For example, if a four-stroke engine is “in phase” on a 720° cycle, it is considered synchronous, and the engine controller can correctly determine which stroke the engine is on. If the four-stroke engine is not synchronous, the engine controller can only determine engine position on a 360° cycle. Many systems must determine engine phase to obtain the appropriate timing on four-stroke engines. A two-stroke engine must only rotate one complete rotation for a complete engine cycle. No phase information must be obtained from this engine cycle. This will be referred to as a 360° engine cycle.

Typically, a fuel injection system utilizes a plurality of sensors on the engine to determine engine operating conditions. For example, a fuel-injected engine may be equipped with a crankshaft position sensor, cam position sensor, throttle position sensor, intake air pressure sensor, and barometric air pressure sensor in addition to other sensors. The engine controller monitors these sensory inputs to determine the appropriate ignition timing, injection timing, and quantity of fuel to be injected. It would be beneficial to reduce the number of sensors necessary to operate an engine, yet maintain accurate control. This would result in fewer components, less complexity, and reduced costs.

One of the various types of data monitored by these sensory inputs to the engine controller is the determination of the intake air pressure. This measurement process can be quite complex. This challenge can be complicated further by monitoring intake air pressure in engines with few cylinders. It is well known in the art that intake pressures fluctuate with the opening and closing of the intake valves during the intake stroke. If there is a plurality of cylinders, there will be more intake events per crankshaft rotation and traditionally less overall intake air pressure fluctuations. However, if few cylinders are present, as in small engines, there will be fewer intake events per crankshaft rotation and large intake air pressure fluctuations will be apparent. If the average intake pressure were to be obtained, it will not be an accurate indication of actual cylinder intake air pressures due to these fluctuations.

Air pressure sensors have been used in the calculation of intake air mass seen by reference to U.S. Pat. No. 6,453,897 to Kanno. In this approach, the intake air pressure of the engine is sampled just once per engine crankshaft revolution. It is generally understood in the art that the air pressure can be used for intake air mass calculations in fuel injection control. Kanno presents a system that has increased accuracy for measuring intake air pressure and therefore increased accuracy in obtaining intake air flow rate and desired air/fuel ratio in the engine. This example presents no applications to determining engine phase or crankshaft position through the air pressure fluctuations. Instead, this approach strictly pertains to a single air pressure measurement at a predetermined crankshaft position. The timing of this measurement is determined through the use of a crankshaft position sensor and engine control unit.

In some applications, the mass air flow rate into the engine is estimated in part by measuring the absolute pressure within the induction manifold (Manifold Absolute Pressure, or “MAP”). A mass air flow rate is the mass of air drawn into an engine over a particular period of time. Air density, or mass per unit volume, is proportional to air temperature, pressure, and humidity of the air drawn into the engine. This data is used to calculate the mass air flow rate of the engine, or mass of the incoming air. Such calculations are known as volume-density or speed-density calculations.

With crankshaft position measurement, a toothed wheel is typically used in conjunction with a pickup to detect positional movement. These devices are traditionally hall effect devices or variable reluctance devices. In automotive applications, the toothed wheel consists of multiple teeth or “timing slugs” evenly spaced on the crankshaft. The number of teeth is traditionally a whole divisor of 360°. As the number of teeth is increased, resolution of the system is increased. In many applications, there is a missing tooth to indicate a predetermined position on the crankshaft itself. An automotive standard of today is known as a “36-1” pattern. This pattern evenly spaces 36 gear teeth on a ring, and has one of the 36 teeth removed to indicate a predetermined angular position. From this input, engine rpm and crankshaft position can be directly measured. Unfortunately, the crankshaft rotates twice for a complete 720° cycle in four stroke engines. A crankshaft position sensor can not indicate engine phase on a four-stroke engine because of this. The crankshaft will be in the exact same position twice during the engine cycle. Additional sensory information is required to synchronize to a 720° cycle, if the engine controller is to operate in a synchronous manner. If the crankshaft is keyed to indicate its position, it is only possible to determine engine position based on 360° cycle, or a single crankshaft rotation without additional sensory information.

Many small engines utilize a crankshaft trigger mechanism for indicating a predetermined crankshaft position for ignition purposes. With this mechanism an ignition spark is emitted every 360° of crankshaft rotation. This type of system is similar to a crankshaft position sensor with the distinction of having only a single signal indicating pulse per crankshaft revolution. A system of this nature typically is not in communication with an engine control device, but is rather part of a stand-alone ignition system. As such, there is little or no memory from one cycle to the next. These systems cannot predict engine timing for fuel injection purposes due to crankshaft acceleration and deceleration. They can however consistently trigger an ignition system at a fixed crankshaft angular position.

To determine engine phase on four stroke engines, an additional sensor is typically used in conjunction with a crankshaft position sensor. A camshaft position sensor may be used to determine an engine's phase. The camshaft rotates at exactly half the speed of the crankshaft and they are mechanically linked. Therefore, these two sensory inputs provide the engine controller with engine position information to run on a synchronous basis to a 720° engine cycle. Due to its nature, a camshaft position sensor is not as accurate as a crankshaft position sensor and therefore they are typically used in combination.

Engine Loading is typically measured with a throttle position sensor which physically measures the angle of the throttle plate. This sensor is used to indicate a desired load from the engine, but does not measure output power of the engine. As the throttle angle increases, engine loading increases. Measurements of this nature are well known in the art.

In most applications, these are all discrete and separate sensors. Each sensor traditionally has only a single role in monitoring engine conditions. They each require their own wiring, connectors, and tooling to be mounted to the engine. These multiple parts all add in the cost of fuel injection implementation. Additionally, if the crankshaft position sensor were to fail for any reason, little or no redundancy is implemented and the engine would cease to operate.

It would be advantageous to reduce the number of sensors necessary to run the engine. If this could be done, cost savings would be realized in fewer sensors, reduced tooling, reduced fixturing, reduced assembly time, and lower design costs. If fewer sensors were required to accurately control fuel injection timing, it would enable a more cost efficient transition of non-fuel injected engines to the technology.

BACKGROUND OF INVENTION—OBJECTS AND ADVANTAGES

Accordingly, several objects and advantages of my invention are the multiple uses of a single intake pressure sensor to measure intake air mass, indicate engine loading, and control the fuel injection and ignition timing of an internal combustion engine. This invention was designed for use on a single cylinder engine, but may be applicable to, but without limitation to, all forms of internal combustion engines exhibiting intake pressure fluctuations. This invention reduces the number of sensors necessary to electronically control an engine by monitoring the intake air pressure over time.

To effectively time an engine, determine engine load, and determine intake air mass, this invention can replace the crankshaft position sensor, camshaft position sensor, throttle position sensor, manifold air pressure sensor, and barometric pressure sensor with a single part. With this technology a single intake air pressure sensor could be used as a stand-alone sensory means for determining engine timing, phase, load, and the mass of the intake air charge. With this information, an engine controller can accurately calculate the appropriate mass of fuel to inject into the engine as well as the appropriate time to inject the fuel and trigger the ignition of the engine.

Air mass measurements can be made through measuring the intake air pressure and applying a speed density calculation. Air mass measurements such as these are well known in the art. Once an intake air mass is known, the corresponding stoichiometric mass of fuel can be accurately metered into the engine.

Engine loading can also be inferred through monitoring the intake air pressure signal. Peak to peak intake pressures are diminished under full throttle applications. When an engine is throttle down from high engine speed to an idle speed, there is accumulated vacuum in the intake tract. This is represented by a decreased peak pressure of the intake pressure waveform. A system of this nature needs to monitor the intake pressure signal over time, and as such has a finite delay. While not as time sensitive as a throttle position sensor, measuring engine load through monitoring the intake pressure signal is well known in the art.

Through monitoring the intake pressure fluctuations, one would obtain a vacuum pulse every two crankshaft rotations (in a four stroke engine). This is indicative of a particular crankshaft position and the time when the intake valve is open. When implemented with a microprocessor, the time interval between intake pressure events could be mathematically modeled to predict when the next event would occur. In addition, this model could offer a prediction of crankshaft position sub-cyclic to the intake pressure events. With this timing information, fuel metering and ignition timing could accurately and precisely be added to an engine in a non-intrusive form. No additional sensors need to be hard tooled or machined into the engine block material. This may be of specific benefit to companies that want to add fuel injection technology to an existing product. This system, while not having resolution as high as a "36-1" tooth crank position pick-up on an automobile engine, offers excellent accuracy at much lower costs.

Many small engines of today use some form of crankshaft trigger for their ignition system. If a crankshaft trigger or crankshaft position sensor input were combined with the crankshaft position detection technology of this patent, increased accuracy and resolution would be obtained in engine timing. Using a crankshaft trigger alone does not allow an engine to be timed on a 720° cycle (in four stroke applications). With the input of the intake pressure fluctuations in addition to a crankshaft trigger, an engine may be aligned in phase on a 720° cycle. When implemented with a microprocessor, the system can be mathematically modeled to predict and monitor intake pressure events. With this information, a much higher resolution can be obtained than in the previous example. With this timing information, fuel metering and ignition timing could accurately and precisely be added to an engine in a non-invasive form.

Redundancy is obtained in a system of this nature. If one of the two sensors were to fail, the other sensor would provide ample signal to enable the engine to continue to be operated, with reduced resolution. This may be a valuable benefit if the engine were to be placed into operation where engine failure cannot be tolerated.

Due to the location of the pressure sensor in the intake tract, this allows for engine manufacturing to be simplified. Tooling, engineering, and design time does not have to be invested in placement of multiple sensors in the engine castings. This control system specifically benefits manufacturers who may want to add fuel injection to an existing carbureted product. The non-invasive nature of this invention lends itself to applications in engines where tooling, packaging, or redesign costs are too high to consider standard fuel injection applications.

Further objects and advantages of my invention will become apparent from a consideration of the drawings and ensuing description.

SUMMARY OF THE INVENTION

A need therefore exists for a less complex fuel injection control system for cost sensitive applications. This invention presents a novel approach for a low cost, low complexity engine timing control, engine load determination, and air mass determination for fuel injection and ignition timing applications.

One aspect of the present invention is a method to reduce the complexity of the fuel injection system through using an intake air pressure sensor to determine engine position, phase, loading, and intake air mass. Pressure fluctuations are present on the intake stroke of the engine and are mechanically related to the opening and closing of the intake valve. The movement of the intake valve is mechanically linked to the crankshaft angle and hence the timing of the engine. There is an intake event every two crankshaft rotations in four-stroke applications, and once every crankshaft rotation for two-stroke engines. The presence of these pressure fluctuations is therefore indicative of engine phase (in four stroke applications), crankshaft position, engine speed, and can directly measure engine rpm. With this information, crankshaft position can be quantitatively measured and engine timing can be determined.

Through measuring the pressure of the incoming air charge one can implement a simple air mass measurement. Once the incoming air mass is calculated, the corresponding stoichiometric mass of fuel can be determined for injection into the combustion chamber at the appropriate time in the engine cycle via the engine controller and fuel injector.

Through monitoring the intake pressure signal, one can determine engine loading and use this as an input to the engine controller to determine fuel mass for injection. Engine load can also be used to modify the timing for spark ignition to prevent premature ignition or knock.

This invention can be used as a stand alone engine control mechanism using a single intake air pressure sensor, or in addition to a crankshaft trigger/position sensor, to accurately time an engine. This system offers less resolution than automotive "36-1" tooth crankshaft position sensors, yet offers excellent position sensing and engine timing at a much lower cost and complexity. Not only is crankshaft position detected, but also engine phasing, engine load, and air mass measurements can be determined with this technology. This technology allows an engine to be electronically controlled for the purpose of injecting fuel and timing the ignition events to help reduce engine emissions and gain efficiencies. The inherent non-invasive nature of this technology lends itself to be easily added to almost any pre-existing internal combustion engine configuration.

Thus, a manufacturer of engines would find it very easy to add the technology of fuel injection to their current product line. They would not need to hard tool or support multiple new sensors in their engine line. This invention allows for relative ease in the addition of fuel injection to engines not currently designed for the technology. The present invention allows for a low cost and extremely robust implementation of fuel injection and spark ignition control on an internal combustion engine.

DRAWINGS—FIGURES

FIG. 1 is a schematic view showing a single cylinder internal combustion engine, configured in accordance with the preferred embodiments of the invention. The intake tract and part of the engine are shown generally in the upper portion of the figure. The engine controller is shown in the lower left portion of the figure. The Engine Controller, sensors, and fuel injection system link the two views together.

DRAWINGS—REFERENCE NUMERALS

Figure 1:
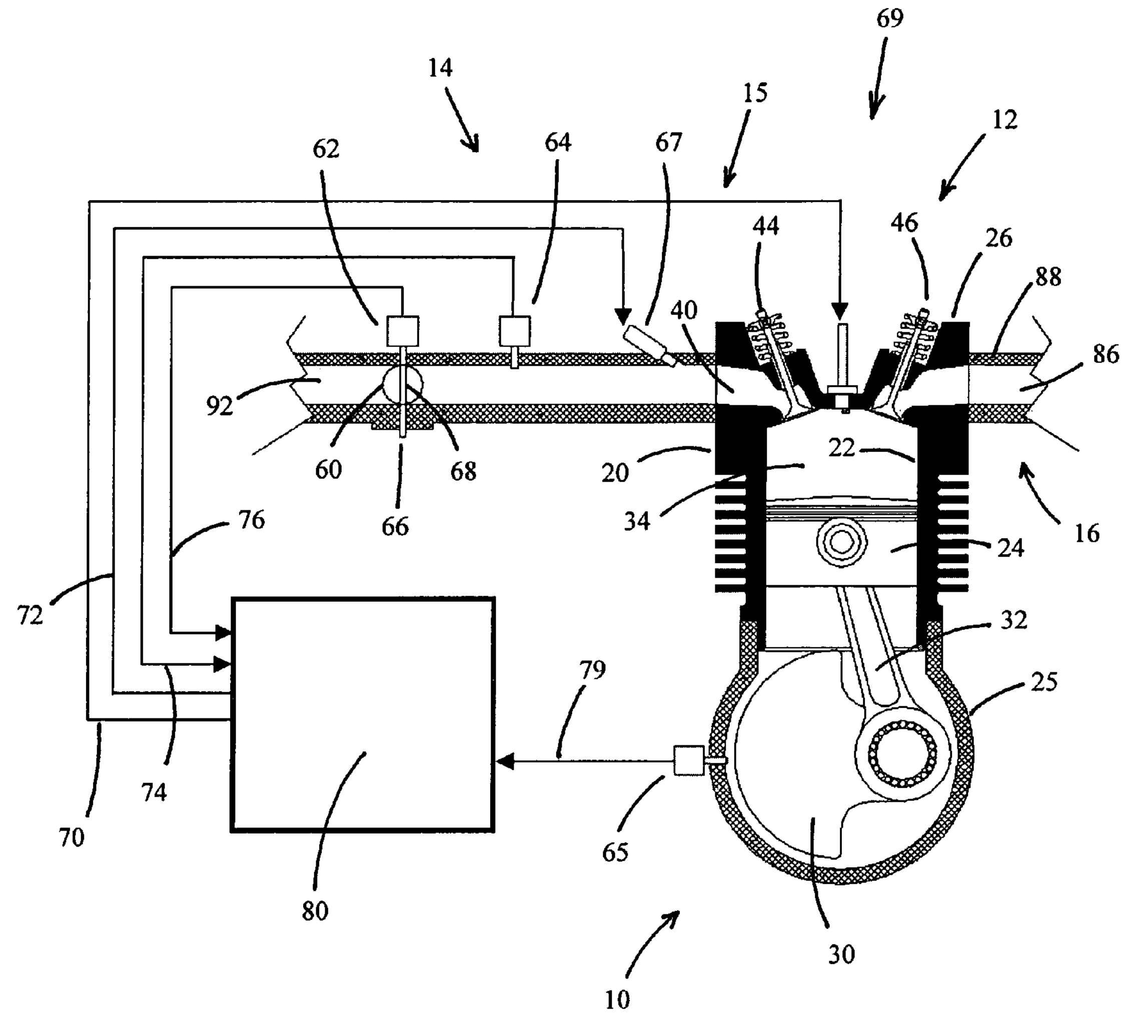

10 Internal combustion engine
12 Power head
14 Air induction system
15 Fuel injection system
16 Exhaust system
20 Cylinder block
22 Cylinder bore
24 Piston
25 Crank case
26 Cylinder head
30 Crankshaft
32 Connecting rod
34 Combustion chamber
40 Intake port
44 Intake valve
46 Exhaust valve
60 Throttle plate
62 Throttle position sensor
64 Intake air pressure sensor
65 Crankshaft position sensor
66 Throttle plate axis of rotation
67 Fuel injector
68 Throttle shaft
69 Ignition system
70 Ignition signal
72 Injector signal
74 Intake pressure signal
76 Throttle position signal
79 Crankshaft position signal
80 Engine Control Unit (ECU)
86 Exhaust port
88 Exhaust pipe

90 Intake plenum
92 Plenum chamber
94 Intake runner
96 Induction air passage
98 Throttle body
100 Opening of the intake valve
101 Exhaust stroke
102 Intake stroke
103 Compression stroke
104 Power stroke
110 Closing of the intake valve
112 Approximate barometric pressure
115 Engine cycle
120 Intake air pressure signal
125 Opening of the intake valve
130 Closing of intake valve
140 Angular Crankshaft Position
145 360° of Crankshaft Rotation
148 End of 720° Engine Cycle
150 0° of Crankshaft rotation

DETAILED DESCRIPTION OF THE PREFERRED EMBODIMENTS OF THE INVENTION

FIG. 1 shows an internal combustion engine 10 for use in an All Terrain Vehicle (ATV, or Four-wheeler). The present invention may also find utility in applications using internal combustion engines, such as, for example but without limitation, personal watercraft, small jet boats, off-road vehicles, heavy construction equipment, motorcycles, lawn tractors, and gas powered yard implements.

As used throughout this description, the terms "forward", "front" and "fore" mean at or to the forward side of exhaust system 16, and the terms "rear", "reverse" and "rearwardly" mean at or to the opposite side of the front side, unless indicated otherwise.

The engine 10 operates on a four-stroke combustion cycle. As shown in FIG. 1, the engine 10 includes a cylinder block 20, which defines a cylinder bore 22. In the illustrated embodiment, the engine 10 is of the single cylinder type.

It is to be noted that the engine may be of any type (V-type, Inline, W-type), may have other numbers of cylinders, and/or may operate under other principles of operation (two-stroke, rotary, or Diesel principles).

A piston 24 reciprocates in the cylinder bore 22. A cylinder head assembly 26 is affixed to one end of the cylinder block 20 and defines a single combustion chamber 34 with the piston 24 and cylinder bore 22. Both ends of the cylinder block 20 are closed with a crankcase member (not shown) defining a crankcase chamber 25 therein.

The engine 10 includes and air induction system 14 and an exhaust system 16. The air induction system 14 is configured to supply air charges to the combustion chamber 34.

Figure 2:
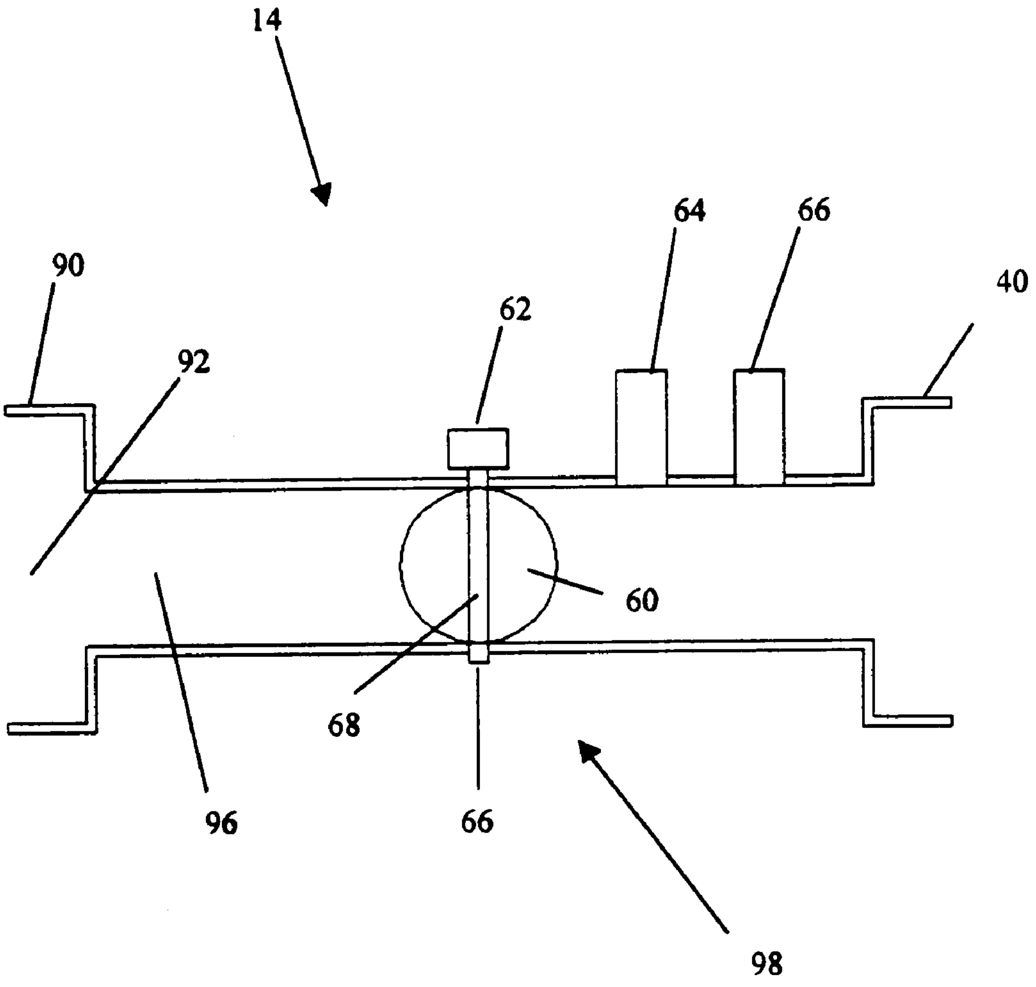
FIG. 2 is a schematic illustration of an air induction system of the engine shown in FIG. 1, with the pressure sensor mounted thereon.

With reference to FIG. 2, the induction system 14 includes a plenum chamber member 90, which defines a plenum chamber 92 therein. The intake runner 94 extends from the plenum chamber 92 and defines an induction air passage 96 therein. The intake passage 96 extends from the plenum chamber 92 to the intake port 40 formed in the cylinder head assembly 26.

With reference to FIG. 1, the intake port 40 is opened and closed by the intake valve 44. When the intake port 40 is opened, air from the intake passage 96 and intake port 40 flows into the combustion chamber 34.

The plenum chamber 92 preferably includes an inlet opening that opens to the external air supply (not shown). The opening to the plenum chamber 92 preferably includes some form of air filtration device (not shown). The plenum chamber 92 functions as an intake air silencer and/or a collector of air charges. The plenum chamber 92 is positioned on the rearward side of the engine 10 and the induction passage extends frontward from the plenum chamber 92 to the intake port 40.

As shown in FIG. 2, a throttle body 98 is provided within the intake runner 94. The throttle body 98 supports the throttle plate 60 for pivotal movement about an axis 66 of a throttle shaft 68, which extends generally vertically through the respective throttle body 98.

The throttle plate 60 is operated via a throttle cable (not shown). The throttle cable is connected to a thumb throttle (not shown) that may be provided on the handlebar (not shown) of the all terrain vehicle.

With reference to FIG. 1, a throttle position sensor 62 is arranged atop of the throttle shaft 68. A signal from the position sensor 62 is sensed by an engine controller ECU 80 via a throttle position data line 76 for use in controlling various aspects of the engine operation including, for example, but without limitation, fuel injection control and ignition timing, which will be described later. The signal from the throttle position sensor 62 corresponds to the engine load in one aspect, as well as the throttle opening.

The air induction passage 96 may include a bypass passage or idle air supply passage that bypasses the throttle plate 60, although such is omitted from FIG. 2. The engine 10 may also include an idle air adjusting unit (not shown) which is controlled by the ECU 80.

In operation, air is introduced into the powerhead 12 and passes through the inlet opening of the plenum chamber 92. During operation of the engine 10, an air charge amount is controlled by the throttle plate 60 to meet requirements of the engine 10. The air charge then flows through the runner 94 into the intake port 40.

As described above, the intake valve 44 are provided at the intake port 40. When the intake valve 44 is opened, the air is supplied to the combustion chamber 34 as an air charge. Under idle running condition, the throttle plate 60 is generally closed. The air, therefore, enters the intake port 40 through the idle air adjusting unit (not shown) which is controlled by the ECU 80. The idle air charge adjusted in the adjusting unit is then supplied to the combustion chamber 34 via the intake port 40. The rpm of the engine 10 at idle is adjusted by varying the small opening in the throttle plate 60. This is accomplished by adjusting a set screw (not shown) to limit the lower travel of the throttle plate 60 about axis 66.

With reference to FIG. 1, the exhaust system 16 is configured to discharge burnt gases, or exhaust gases, from the engine's 10 combustion chamber 34. The exhaust port 90 is defined by the cylinder head assembly 26 and is opened and closed by the exhaust valve 46. When the exhaust port 86 is opened, the combustion chamber 34 communicates with a single exhaust pipe 88, which guides the exhaust gases downstream through the exhaust system 12.

A single camshaft (not shown) is provided to control the opening and closing of the intake valve 44 and the exhaust valve 46. The camshaft has cam lobes that act against valves 44, 46 at predetermined timing in relation to the crankshaft 30 to open and close the intake port 40 and exhaust port 90. The camshaft is jounaled in the cylinder head assembly 26 and is driven by a chain (not shown) mechanically connected to the crankshaft 30.

With reference to FIG. 1, the engine 10 also includes a fuel injection system 15. The fuel injection system 15 includes a fuel injector 67 which has an injection nozzle exposed to the intake port 40 so that fuel is directed toward the combustion chamber 34. A main fuel supply is located in a fuel tank (not shown) from which fuel is supplied via fuel system (not shown). Fuel is dawn from the fuel tank through a fuel filter (not shown) by a fuel pump (not shown). The pressure of the fuel is regulated by a fuel pressure regulator (not shown) and the fuel is sent to the fuel rail (not shown) and provided to the injector 67 for injection into the combustion chamber 34. Excess fuel that is not used by the injectors is fed through a fuel return line that is provided back to the fuel tank. The timing and duration of the fuel injection pulse is dictated by the ECU 80, which is described below in detail.

The fuel charge from the fuel injector 67 enters the combustion chamber 34 with an air charge at the moment the intake valve 44 is opened. Since the fuel pressure is regulated by the pressure regulator, a duration during which the nozzles of the injector 67 are opened is determined by the ECU 80 to measure the amount of fuel to be injected by the fuel injector 67. The ECU 80 through the fuel injector control line 72 thus controls the duration and the injection timing. Preferably, the fuel injector 67 has nozzles that are opened by solenoid action, as is know in the art. Thus the fuel injector control line 72 signals the solenoids to open and close according to the timing and duration determined by the ECU 80.

The engine 10 further includes an ignition system, generally indicated by reference to numeral 67. A spark plug 65 is fixed to the cylinder head assembly 26 and is exposed to the combustion chamber 34. The spark plug 65 ignites the air and fuel charge mixture in the combustion chamber 34 with timing as determined by the ECU 80. For this purpose, the ignition system 69 preferably includes an ignition coil (not shown) interposed between the spark plug 65 and the spark plug control line 70.

The engine 10 also preferably includes an AC generator (not shown) for generating electrical power. Additionally, the engine 10 preferably includes a battery (not shown) for storing electrical energy from the AC generator and to supply power to the ECU 80, the engine sensors (Intake Air Temperature sensor 63, Throttle Position Sensor 62, Intake Air Pressure sensor 64, Crankshaft Position sensor 65), fuel pump, fuel injector 67, and the ignition coil.

While not illustrated, the engine 10 also includes a recoil starter or electric starter motor to drive the crankshaft 30 for starting the engine 10. The engine 10 is turned over at a speed where the engine can operate under its own power.

A transmission (not shown) is typically integrated to the engine crank case 25 casting in an engine of this type. Although it is not illustrated power is coupled from the crankshaft, through the transmission, and to the vehicle drive system to provide motion.

The engine 10 also preferably includes a lubrication system (not shown). This lubrication system is provided for lubricating certain portions of the engine 10, such as, for example, but without limitation, the pivotal joints of the connecting rod 32 with the crankshaft 30 within the crank case 25 and the walls of the cylinder bore 22.

The engine 10 also preferably includes a cooling system (not shown) for cooling the heated portions of the cylinder block 20 and the cylinder head 26. A water jacket (not shown) is defined in the cylinder block 20, and is in thermal communication with the cylinder bore 22. A water pump (not shown) circulates the coolant through the engine 10 and a radiator (not shown).

As noted above, the ECU 80 controls engine operations including fuel injection from the fuel injectors 67 and ignition timing to the spark plug 65, according to various control maps stored in the ECU 80. In order to determine appropriate control scenarios, the ECU 80 utilizes such maps and/or indices stored within the ECU 80 in reference to data collected from various sensors.

Any type of desired control strategy can be employed for controlling the time and duration of the fuel injection from the fuel injector 67 and the timing of the firing of the spark plug 65, however a general discussion of some engine conditions that can be sensed and some of the engine conditions that can be sensed for engine control follows. It is to be understood, however, that those skilled in the art will readily understand how various control strategies can be employed in conjunction with the components of the invention.

As shown in FIG. 1, a crank position sensor 65 measures the crank angle and sends it to the ECU 80, as schematically indicated. In the illustrated embodiment, the crank position sensor 65 is in the form of a crank trigger, which is configured to emit a single pulse for each revolution of the crankshaft 30. The signal from the crank position sensor 65 is transmitted to the ECU 80 via a crank position data line 79. Engine load can be sensed by the angle of the throttle plate 60, and is sensed by the throttle position sensor 62 and is transmitted to the ECU 80 via the throttle position data line 76.

An intake air temperature sensor 63 measures the temperature of the incoming air to the intake runner 94. The signal from the intake air temperature sensor 63 is transmitted to the ECU 80 via the intake air temperature data line 78. An intake air pressure sensor 64 is connected to the intake runner 94 between the throttle plate 60 and the intake port 40 and measures the pressure of the incoming air charge in the induction air passage 96. The measurement of the intake air pressure sensor 64 is transmitted via the intake air pressure data line 74 to the ECU 80.

The sensed conditions disclosed above are merely some of those conditions which may be sensed for under control and it is, of course, practicable to provide other sensors such as, for example, without limitation, an oxygen sensor, Fuel pressure sensor, fuel temperature sensor, Engine coolant temperature sensor, oil pressure sensor, barometric air pressure sensor, and cam position sensor.

The ECU 80 computes and processes the detected signal from each sensor based on a control map. The ECU 80 forwards control signals to the fuel injector 67 and spark plug 65. Respective control lines are indicated schematically in FIG. 1, which carry the control signals.

As noted above, the ECU 80 determines the appropriate duration of fuel injection in order to produce a charge with a desired air fuel ratio. Thus, part of the determination of fuel injection duration is based on the induction air through the induction passage 96. The mass flow rate of the induction air charge through the induction passage is determined by the ECU 80 and a stoichiometric ratio of fuel is added by the fuel injector 67 as determined by the ECU 80 and fuel injector control line 72.

During operation of the engine 10, the ECU 80 samples the output signal from the intake pressure sensor 64 to determine crankshaft position 140 while the crankshaft 30 rotates from 0° of crankshaft rotation 150, through 360° of crankshaft rotation 145, and 720° or crankshaft rotation 148.

Figure 3:
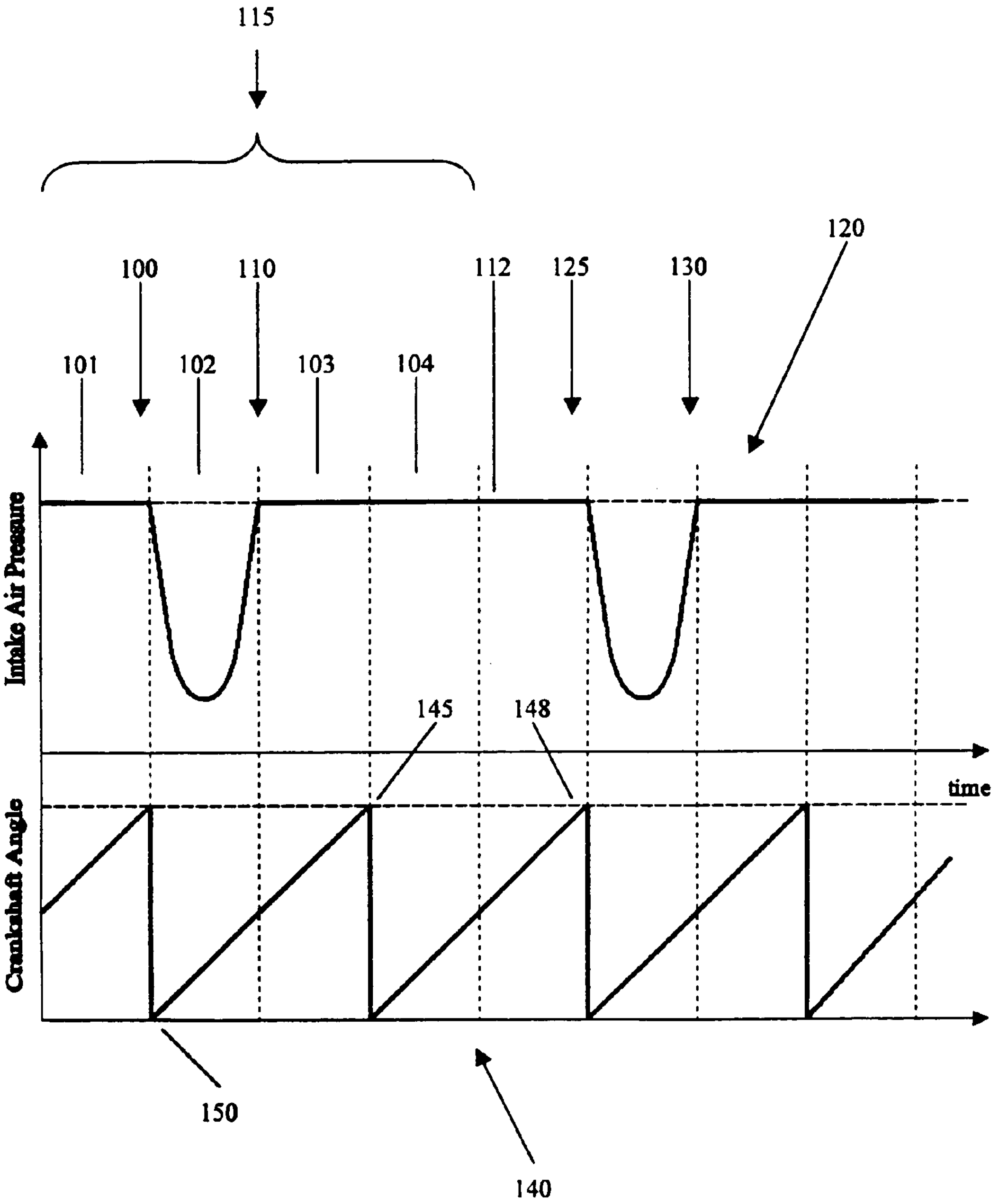
FIG. 3 is a graphical illustration of the timing relationship between an output signal of the pressure sensor shown in FIG. 2 and actual crankshaft position.

Both 360° of crankshaft rotation 145 and 720° of crankshaft rotation 148 are known as Top Dead Center as the Piston 24 is in the top most position of travel within the cylinder bore 22. Monitoring the signal from the crank position sensor 65 adds resolution to the determination of the crankshaft position 140. In reference to FIG. 3, the intake pressure signal 120 fluctuates with the opening of the intake valve at 100 and closing of the intake valve at 110, during the intake stroke 102 of the four-stroke engine 10. During the intake stroke 102, the intake valve 44 opens to allow the intake air/fuel charge to flow from the intake port 40 into the combustion chamber 34 creating pressure fluctuation 100 on the intake pressure signal 120 from the intake pressure sensor 64. As the piston 24 travels to the bottom portion of its travel in the cylinder bore 22, the intake valve 44 closes creating pressure fluctuation 110 on the intake pressure signal from the intake pressure signal 120 from the intake pressure sensor 64.

In this embodiment, the intake pressure signal 100 to 110 from the intake pressure sensor 64 is observed every two full crankshaft rotations as the engine 10 is of the four-stroke type. The time difference between these pressure fluctuations is indicative of engine speed N and can be calculated by the ECU 80. In addition, the pressure fluctuations 100 to 110 allows the ECU 80 to determine engine phase on a 720° engine cycle as the intake valve 44 only opens once per every two full rotations of the crankshaft 30 on the four stroke engine cycle. During the compression stroke 103, power stroke 104, and exhaust stroke 101 the intake pressure sensed by the intake pressure sensor 64 is close to the barometric air pressure 112 of the outside air.

In order to determine proper engine timing for the ECU 80 to inject fuel from the fuel injector 67 or trigger the ignition of the spark plug 65, the ECU 80 must have a model of the engine characteristics having inputs from the intake air pressure sensor 64 and optionally the crank position sensor 65 to determine crankshaft position 140 while the engine 10 is operating. An example of a model, for example, but without limitation, is the implementation of a predictive model where crankshaft position is based on the time period of the previous cycle 115 of intake air pressure fluctuations 100 to 110 of the intake air pressure signal 120 to predict crankshaft position for the next cycle 125 to 130. With a model of this type, the engine timing of each cycle 115 is based on the previous engine cycle. Other control algorithms could be implemented, without limitation, with the same technology of this invention for sensing engine speed N, phase, and/or position.

It is to be noted that the intake air pressure signal 120 may have additional small fluctuations (not shown) depending upon engine 10 operating conditions. These fluctuations may take the form of signal "noise" and can be attenuated via electronic filter within the ECU 80 or digitally by software in the ECU 80 itself to attenuate predetermined frequencies. By including any passive form of signal smoothing, time delays and signal attenuation may be introduced into the present air pressure signal 120 to the ECU 80.

Of course, the foregoing description is that of certain features, aspects and advantages of the present invention to which various changes and modifications may be made without departing from the spirit or scope of the present invention. While I have shown and described specific embodiments of this invention, further modifications and improvements will occur to those skilled in the art. All such modifications that retain the basic underlying principles disclosed and claimed herein are within the scope of this invention. The present invention, therefore, should only be defined by the appended claims.

What is claimed is:

1. An engine control apparatus for determining engine position and intake air mass from a single sensory means, comprising:

(a) an engine having at least one cylinder, a piston in said cylinder, a crankshaft connected to said piston, said piston being adapted to reciprocate between top dead center position and bottom dead center position defining a combustion chamber, an intake valve controlling the induction of an air mass into said combustion chamber with predetermined timing related to said crankshaft's angular position, said engine air induction system having its chamber contiguous with said valve and said engine combustion chamber, a pressure sensing element in communication with said air induction chamber;

(b) a pressure sensor means for developing periodic sensor voltage timing pulses, the cycle time between timing pulses being an indication of engine crankshaft speed, and the pulse timing being an indication of a particular crankshaft degree of angular position;

(c) a pressure sensor means for measuring intake air mass for the determination intake air mass;

(c) a means for measuring in real-time, intake air pressure, cycle time, and crankshaft position.

2. The combination set forth in claim 1 wherein said engine control apparatus is in combination with a pressure sensor means to detect engine load.

3. The combination set forth in claim 1 wherein said engine control apparatus is in combination with an additional sensory means to detect crankshaft position.

4. The combination set forth in claim 3 wherein said engine control apparatus is in combination with a pressure sensor means to detect engine load.

5. The combination set forth in claim 3 wherein said engine control apparatus comprises redundant means to determine crankshaft position, where in the event of singular sensory component failure, the engine control apparatus is capable of determining crankshaft position to maintain engine run capability.

6. A method of determining engine position and intake air mass from intake air pressure comprising:

(a) providing an engine with at least one cylinder, a piston in the cylinder, a crankshaft connected to the piston, the piston being adapted to reciprocate between a top dead center position and a bottom dead center position defining a combustion chamber, an intake valve controlling the induction of an air mass into the combustion chamber with a predetermined timing related to the crankshaft's angular position, the engine air intake induction system having its intake chamber contiguous with the valve and the engine combustion chamber;

(b) providing a pressure sensing element in communication with the air induction chamber;

(c) detecting the pressure in said induction chamber with the pressure sensing element, the pressure being used to calculate intake air mass into the combustion chamber;

(d) detecting the pressure fluctuations in said induction chamber with the pressure sensing element, the pressure fluctuations being in response to the valve opening to allow the intake air/fuel charge to flow into the combustion chamber;

(e) generating intake pressure signals with the pressure sensing element in response to the pressure fluctuations;

(f) generating intake pressure signals with the pressure sensing element in response to the pressure in the induction chamber; and (g) determining, in real time, cycle time, crankshaft position, and intake air mass based on the intake pressure signals.

7. The method according to claim 6, further comprising providing a pressure sensor means to detect engine load.

8. The method according to claim 6, further comprising providing a sensory means to detect the crankshaft position.

9. The method according to claim 8, further comprising providing a pressure sensor means to detect engine load.

10. The method according to claim 6, further comprising a redundancy to determine crankshaft position, wherein the event of a singular sensory component failure, the engine control apparatus is capable of determining crankshaft position to maintain engine running capability.

11. An engine control apparatus for determining engine position and intake air mass from intake air pressure, said control apparatus comprising;

(a) an engine having at least one cylinder, a piston in said cylinder, a crankshaft connected to said piston, said piston being adapted to reciprocate between a top dead center position and a bottom dead center position defining a combustion chamber, an intake valve controlling the induction of an air mass into said combustion chamber with predetermined timing related to said crankshaft's angular position, said engine air induction system having its induction chamber contiguous with said valve and said engine combustion chamber;

(b) a pressure sensing element in communication with said air induction chamber, said pressure sensing element sensing pressure fluctuations in said air induction chamber when said valve opens to allow the intake air/fuel charge to flow into said combustion chamber, and said pressure sensing element generating intake pressure signals in response to said pressure fluctuations; and (c) an engine controller in communication with said pressure sensing element and configured to determine, in real time, cycle time, crankshaft position, and intake air pressure based on said intake pressure signals to thereby determine engine timing and intake air mass to properly run said engine.

12. The combination set forth in claim 11 wherein further comprising a crankshaft position sensor to detect crankshaft position.

13. The combination set forth in claim 12 wherein said crankshaft position sensor comprises a crank trigger.

14. The combination set forth in claim 11 further comprising at least one additional sensor chosen from a throttle position sensor, an air intake air temperature sensor, engine coolant temperature sensor, fuel pressure sensor, and a crankshaft position sensor, said additional sensor in communication with said engine controller.

15. An engine control apparatus for determining engine position, intake air mass, and engine load from intake air pressure, said control apparatus comprising;

(a) an engine having at least one cylinder, a piston in said cylinder, a crankshaft connected to said piston, said piston being adapted to reciprocate between a top dead center position and a bottom dead center position defining a combustion chamber, an intake valve controlling the induction of an air mass into said combustion chamber with predetermined timing related to said crankshaft's angular position, said engine air induction system having its induction chamber contiguous with said valve and said engine combustion chamber;

(b) a pressure sensing element in communication with said air induction chamber, said pressure sensing element sensing pressure fluctuations in said air induction chamber when said valve opens to allow the intake air/fuel charge to flow into said combustion chamber, and said pressure sensing element generating intake pressure signals in response to said pressure fluctuations; and (c) an engine controller in communication with said pressure sensing element and configured to determine, in real time, cycle time, crankshaft position, and intake air pressure based on said intake pressure signals to thereby determine engine timing, engine loading, and intake air mass to properly run said engine.

16. The combination set forth in claim 15 wherein further comprising a crankshaft position sensor to detect crankshaft position.

17. The combination set forth in claim 16 wherein said crankshaft position sensor comprises a crank trigger.

18. The combination set forth in claim 15 further comprising at least one additional sensor chosen from an air intake air temperature sensor, engine coolant temperature sensor, fuel pressure sensor, and a crankshaft position sensor, said additional sensor in communication with said engine controller.

* * * * *